United States Patent
Deerberg et al.

(10) Patent No.: US 11,583,160 B2
(45) Date of Patent: Feb. 21, 2023

(54) CLEANING CART AND FRAME THEREFOR

(71) Applicant: Carl Freudenberg KG, Weinheim (DE)

(72) Inventors: Jens Deerberg, Essen (DE); Torsten Gratzki, Essen (DE); Steve Barber, Manchester (GB); Ralf Juergens, Laudenbach (DE); Felix Fallenstein, Speyer (DE); Nikolai Sand, Speyer (DE); Andreas Eisenhut, Pullach (DE)

(73) Assignee: CARL FREUDENBERG KG, Weinheim (DE)

( * ) Notice: Subject to any disclaimer, the term of this patent is extended or adjusted under 35 U.S.C. 154(b) by 334 days.

(21) Appl. No.: 16/762,945

(22) PCT Filed: Nov. 8, 2018

(86) PCT No.: PCT/EP2018/080538
§ 371 (c)(1),
(2) Date: May 11, 2020

(87) PCT Pub. No.: WO2019/092062
PCT Pub. Date: May 16, 2019

(65) Prior Publication Data
US 2020/0305676 A1  Oct. 1, 2020

(30) Foreign Application Priority Data
Nov. 13, 2017  (DE) .................... 10 2017 010 461.1

(51) Int. Cl.
*A47L 13/51* (2006.01)
*B65D 43/16* (2006.01)
(Continued)

(52) U.S. Cl.
CPC .............. *A47L 13/51* (2013.01); *B65D 43/16* (2013.01); *H04M 1/04* (2013.01); *B62B 3/02* (2013.01);
(Continued)

(58) Field of Classification Search
CPC .......... A47L 13/51; B65D 43/16; H04M 1/04; B62B 3/02; B62B 2202/50; G06F 1/1626
(Continued)

(56) References Cited

U.S. PATENT DOCUMENTS 6,273,310 B1 * 8/2001 Gregory .................. B60R 7/005
224/282
6,497,423 B1  12/2002 Perelli et al.
(Continued)

FOREIGN PATENT DOCUMENTS

CN  2884716 Y  3/2007
CN  104176164 A  12/2014
(Continued)

*Primary Examiner* — John D Walters
*Assistant Examiner* — Hilary L Johns
(74) *Attorney, Agent, or Firm* — Leydig, Voit & Mayer, Ltd.

(57) ABSTRACT

A cleaning cart includes: a support body; and a communication device holder for receiving a mobile communication device. The communication device holder is secured to the support body. In an embodiment, the support body has a double-shell construction, including an outer first shell and an inner second shell. The first shell covers the second shell in an essentially dome-shaped manner.

33 Claims, 4 Drawing Sheets

(51) Int. Cl.
*H04M 1/04* (2006.01)
*B62B 3/02* (2006.01)
*G06F 1/16* (2006.01)

(52) U.S. Cl.
CPC ........ *B62B 2202/50* (2013.01); *G06F 1/1626* (2013.01)

(58) Field of Classification Search
USPC .......................................................... 206/216
See application file for complete search history.

(56) References Cited

U.S. PATENT DOCUMENTS

| | | | | |
|---|---|---|---|---|
| 7,284,393 B1* | 10/2007 | Macmillan | ................ | F25D 3/06 62/331 |
| 7,523,046 B2 | 4/2009 | Colalancia et al. | | |
| 8,973,928 B2 | 3/2015 | Mellinger | | |
| 2004/0262867 A1* | 12/2004 | Arceta | ................ | A61G 12/001 280/47.35 |
| 2006/0157946 A1* | 7/2006 | Stuemke | ............... | B65F 1/1468 280/79.5 |
| 2006/0232033 A1* | 10/2006 | Pint | ........................ | B62B 5/02 280/79.2 |
| 2007/0267832 A1* | 11/2007 | Denissov | ................ | A47L 13/59 280/47.35 |
| 2009/0212518 A1* | 8/2009 | Bustle | ................... | A61G 12/001 108/1 |
| 2012/0236496 A1* | 9/2012 | McRorie | ................ | F16M 13/00 361/679.55 |
| 2015/0091265 A1* | 4/2015 | Bentson | ..................... | B62B 1/26 280/47.19 |
| 2015/0108190 A1 | 4/2015 | Crum | | |
| 2015/0225004 A1* | 8/2015 | Dunford | ................ | B62B 3/002 280/42 |
| 2016/0051022 A1* | 2/2016 | Morszeck | ............... | A45C 5/02 190/115 |
| 2016/0107668 A1* | 4/2016 | Robins | .................. | B62B 3/1472 224/411 |
| 2016/0234356 A1* | 8/2016 | Thomas | .................. | H04K 3/84 |
| 2017/0140631 A1 | 5/2017 | Pietrocola | | |
| 2021/0037964 A1* | 2/2021 | Lamson | ................ | A47B 31/00 |

FOREIGN PATENT DOCUMENTS

| | | |
|---|---|---|
| CN | 205532000 U | 8/2016 |
| CN | 107046799 A | 8/2017 |
| DE | 20080287 U1 | 12/2001 |
| DE | 202005008791 U1 | 10/2006 |
| ES | 1076358 U | 2/2012 |
| WO | WO 2013112644 A1 | 8/2013 |

\* cited by examiner

Fig. 4    Detail A (Fig.3)

CLEANING CART AND FRAME THEREFOR

CROSS-REFERENCE TO PRIOR APPLICATIONS

This application is a U.S. National Phase application under 35 U.S.C. § 371 of International Application No. PCT/EP2018/080538, filed on Nov. 8, 2018, and claims benefit to German Patent Application No. DE 10 2017 010 461.1, filed on Nov. 13, 2017. The International Application was published in German on May 16, 2019 as WO 2019/092062 under PCT Article 21(2).

FIELD

The invention relates to a cleaning cart and a frame therefor.

BACKGROUND

Cleaning carts are generally known and are used, for example, for professional building cleaning, wherein all cleaning tools needed for cleaning are accommodated in or on the cleaning cart.

Typically, such tools are, for example, cleaning devices, cleaning cloths and/or cleaning agents.

The advantage of a cleaning cart is that the user can transport a plurality of cleaning tools in an energy-conserving and convenient manner.

Cleaning itself and the use of cleaning carts have been purely analog matters in the past. Users of cleaning carts statically work through cleaning schedules on their own.

However, digital communication, for example between a cleaning center and the cleaning cart and/or the user, cannot take place. The rapid retrieval of information from the Internet when needed, for example in order to answer unforeseen questions relating to the user's work day, has hitherto also been functionally decoupled from the cleaning cart.

SUMMARY

In an embodiment, the present invention provides a cleaning cart, comprising: a support body; and a communication device holder configured to receive a mobile communication device, wherein the communication device holder is secured to the support body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention further develops a cleaning cart of the type mentioned at the outset in such a way that a user's work is facilitated by the digitalization of the cleaning cart.

In an embodiment, the present invention provides a cleaning cart, which comprises a support body and a communication device holder for receiving a mobile communication device, wherein the communication device holder is secured to the support body.

This has the advantage that the cleaning cart can be easily and quickly equipped with a mobile communication device, for example a tablet computer or a smartphone, and can thereby be digitalized. Through the mobile communication device, the cleaning cart is always online and the user of the cleaning cart is always able to communicate worldwide. This can be achieved by the user sending messages to a cleaning center, receiving messages from a cleaning center and/or being connected to the Internet, in order to be able to, for example, directly order more cleaning tools when needed or retrieve special cleaning instructions directly from the Internet.

Suitable apps are installed on the mobile communication device for this purpose.

By digitalizing the cleaning cart by means of the mobile communication device accommodated in the communication device holder, it is possible, for example, to prevent parts of a building from being cleaned if, for example, they are not dirty. Digitalization of the cleaning cart also makes it possible to communicate where the cleaning cart is currently located.

For example, the user may communicate in real-time with a cleaning center, for example, if cleaning tools run out or a cleaning device needs to be repaired.

Cleaning carts and users can be automatically and specifically sent to where they are needed.

The support body can be of double-shell construction, comprising an outer first shell and an inner second shell, wherein the first shell covers the second shell in an essentially dome-shaped manner, wherein the first shell and the second shell define an intervening space, wherein the communication device holder is arranged in the intervening space and wherein the first and the second shell can be folded away from each other by means of a joint to open the intervening space. Given that the communication device holder is arranged in the intervening space, the mobile communication device held by the communication device holder is well-protected from external influences. The intervening space and the mobile communication device located therein are protected against dirt and/or moisture as well as from unauthorized access. For this purpose, it can be provided, for example, for the intervening space to be sealed off from the environment and/or to be lockable by at least one lock.

The communication device holder can be connected in a force-fitting and/or positive-locking manner to the first shell or to the second shell. For example, it is possible for the communication device holder to be formed by rubber bands, by means of which the mobile communication device is held on the inside of the first shell.

In one embodiment, it can be provided for the support body and the communication device holder or the second shell and the communication device holder to be designed to merge integrally into one another and be made of the same material. This means the cleaning cart consists of few parts.

In another embodiment, the communication device holder can be designed as a separate component.

The communication device holder can be arranged on the side of the second shell that faces the first shell. The communication device holder may comprise, for example, a shell-shaped depression which is adapted to the shape of the mobile communication device to be received.

The second shell may have a hole or recess, in which the communication device holder is arranged. As a result, the communication device holder is always connected to the second shell in the same position in a manner that makes it easy for the user to operate.

The communication device holder can comprise an adapter for receiving different communication devices.

The communication device holder can be adapted, for example, to a tablet computer to be used or to a smartphone.

The communication device holder is preferably arranged in a manner essentially flush with the surface inside the hole or recess of the second shell. In this case, it is advantageous that there are no sharp-edged shoulders or protrusions within the intervening space, and that the user of the cleaning cart is able to place the mobile communication device to be used into the communication device holder or remove it from the communication device holder particularly easily and safely. In addition, arrangement of the communication device holder flush with the surface allows the intervening space to be easily and thoroughly cleaned.

The first shell may have a transparent field of view that is essentially superimposed on the communication device holder. The mobile communication device is visible from outside through the field of view when used as intended.

The transparent field of view can be tinted if needed.

If, for example, a mobile communication device is arranged in the communication device holder of the cleaning cart, but is not switched on, the mobile communication device cannot be seen through the tinted transparent field of view. This means the mobile communication device arranged in the intervening space is better protected from unauthorized access or theft.

The mobile communication device in the communication device holder is only switched on and viewable and/or operable through the transparent field of view when the cleaning cart is in use.

The field of view is preferably not detachable from the first shell. In this case, it is advantageous that the intervening space is not accessible through the field of view. This likewise makes unauthorized access to the communication device more difficult. The intervening space and the mobile communication device received in the communication device holder are accessible only if the first and the second shell are folded away from one another around the joint.

In another embodiment, it can be provided for the field of view to be arranged in the first shell in a force-fitting and/or positive-locking manner and to be non-destructively detachable. A mobile communication device can be mounted in the communication device holder in such a way that the transparent field of view is first removed from the first shell, the mobile communication device is then inserted into the communication device holder through the opening formed, and the field of view is then remounted in the first shell, in order to close up the intervening space and protect the mobile communication device from external influences. In this case, it is not necessary to open the intervening space in order to deposit the mobile communication device in the communication device holder.

The field of view may be connected to the first shell by a snap-in device.

The field of view can be designed as a touch-sensitive control panel for operating the mobile communication device arranged in the communication device holder. This simplifies the handling of the mobile communication device as much as possible. The user of the cleaning cart can still operate the mobile communication device with damp and/or dirty fingers without damaging it. Direct contact between the user and the mobile communication device is prevented by the touch-sensitive control panel.

The second shell can have at least one storage area adjacent to the communication device holder for storing at least one peripheral device of the communication device. In this case, it is advantageous that the cleaning cart can also be operated largely autonomously during a long service life.

A peripheral device may be, for example, a power pack for the mobile communication device, in order to ensure its function even if it is used frequently and/or for a long time, for example, if it is constantly online.

The storage area can have at least one peripheral device holder for receiving the peripheral device. The peripheral device can be received in this peripheral device holder in the same way the communication device is received in the communication device holder.

The communication device and peripheral device can be received in the corresponding holders in a force-fitting and/or positive-locking manner. This prevents the undesired slipping of the mobile communication device and of the peripheral device within their respective holders.

The second shell can have at least one storage area adjacent to the communication device holder for further objects. This storage area can be used, for example, to store pen and paper. Other objects the user of the cleaning cart wishes to take along without carrying them on his or her person can also be stored thereon and, like the communication device and/or peripheral device, are arranged in the intervening space in such a way that they cannot be lost.

The support body can be designed as a cover for a container that opens upwards, the first shell as an outer cover and the second shell as an inner cover. In this way, the communication device holder forms an integral component of the cover and thus of the cleaning cart. As will be described in more detail below, the outer cover and the inner cover can be brought into the open position together to uncover the opening of the container.

Through the joint connecting the outer and the inner cover, the intervening space can also be opened to provide access to the communication device holder and the communication device.

The cover can be brought into the open or closed position as needed by means of a spring-damper system. In this case, it is advantageous that the spring-damper system considerably simplifies the handling of the cleaning cart. The spring-damper system can move the cover into the open or closed position essentially automatically.

The spring-damper system may include end position damping. In this case, it is advantageous that the cover moves into its end position in a damped manner. This prevents undesired noises or vibrations which could damage the cleaning cart.

In an advantageous embodiment, it can be provided for the end position damping to start from a first opening angle of the cover of ≥45°. As a result, when the cover is opening, it moves smoothly from the onset of end position damping until it reaches its end position, irrespective of whether the cover is carrying a mobile communication device or not.

The cover may have a second opening angle of ≥90°, which is limited by an end stop.

The second opening angle may be 90° to 95°. In this case, it is advantageous that the opening of the container that opens upwards is completely uncovered when the cover is open. This is of particular advantage for professional applications.

The end stop can be arranged on at least one lateral cover side of the outer cover. Therefore, the end stop does not need to be a separately produced and mounted component.

The end stop can be formed by a form fit. Such an embodiment can be produced simply and cost-effectively and is functional for a long service life without needing maintenance.

The outer cover can comprise a first lock for locking the cover in its closed position and/or the inner cover can comprise a second lock for locking the inner cover inside the outer cover.

The first lock in the outer cover locks the cover in its closed position on the container. This further ensures that the intervening space between the inner and the outer cover cannot be opened without authorization, even if the whole cover is in the open position. Contents located in the intervening space are therefore protected from undesired access from outside.

Even if the cover is in the open position, the second lock must be opened in order to gain access to the intervening space.

In an advantageous embodiment, it can be provided for the second lock to be connected downstream of the first lock in a functional series connection. In such an embodiment, to obtain access to the intervening space and the contents inside it, in particular the mobile communication device, the first lock must first be opened in order to move the cover into the open position relative to the container which it is keeping closed. After this, once the cover is open, the second lock must be unlocked to allow the inner and outer covers to be folded away from each other. Only then is the intervening space in which the communication device holder is located accessible. Expensive communication devices, such as tablet computers, and/or confidential data located thereon, are thereby protected particularly securely from unauthorized access.

The user of the cleaning cart can benefit from simplified handling in that the outer cover preferably comprises a first unlocking device which, after being activated, moves the cover out of its closed position automatically through a spring force by means of the spring-damper system until it reaches the end stop in the open position. In this case, it is advantageous that the user can activate the unlocking device by means of an elbow. After the unlocking device is activated, the cover automatically swings into the open position and completely uncovers the opening of the container. The user need not have hands free to activate the unlocking device. This simplifies the operation of the cleaning cart.

The outer or inner cover can comprise a second unlocking device which, after being activated, brings the intervening space between the outer cover and the inner cover into the open position.

As described above, this second unlocking device can also be unlocked by the user's elbows.

To open the intervening space, the user can use fingers to release a snap hook which connects the two covers to one another.

The first unlocking device can be embodied as a spring-loaded latch, which is unlocked by simple pressing and latches by itself when the cover is moved into the closed position.

The cleaning cart may comprise a container that opens upwards and a support body or cover, each as previously described, wherein the support body or cover can be connected by a frame to the container that opens upwards.

The frame and the support body or the frame and the cover may form a preassembled unit. In this case, it is advantageous that the preassembled unit as a whole can be placed on top of and connected to the container that opens upwards. The preassembled unit is particularly easy to manage in terms of size and weight. After completing work, the user of the cleaning cart can remove the preassembled unit from the container and, for example, take it to a cleaning center for evaluation. At the cleaning center, the mobile communication device can be read out and, if necessary, prepared for its next use.

Alternatively, the frame can be inserted once together with the cover and snapped into the upper frame of the cleaning cart via snap hooks. The cover/frame is then released by unlocking the snap hooks, for example four or six of them, which are arranged on the circumference.

The frame and the support body or the frame and the cover can be connected to one another by means of the spring-damper system. This simplifies handling as already described above.

The frame can have functional elements on its outer circumference, which are, for example, preferably formed by holding clips or hooks for cleaning devices.

The invention also relates to a frame, as described above, for a container that opens upwards belonging to a cleaning cart.

Existing analog cleaning carts with at least one container that opens upwards can also be digitalized by the frame according to the invention. Existing cleaning carts can be upgraded in a simple and cost-effective manner by simple replacement of the frame.

FIGS. 1 to 4 show an exemplary embodiment of the cleaning cart according to the invention.

In the exemplary embodiment shown, the support body 1 with its outer first shell 4 and its inner second shell 5 is formed by a cover 35 for a container that opens upwards 15, wherein the first shell 4 is configured as the outer cover 16. The second shell 5 is configured as the inner cover 17.

The cleaning cart further comprises a communication device holder 2 for receiving a mobile communication device 3 which, in the exemplary embodiment shown, is formed by a tablet computer, wherein the mobile communication device 3 is arranged in the communication device holder 2 in such a way that it cannot be lost.

The outer cover 16 and the inner cover 17 define an intervening space 6, in which the communication device holder 2 and the communication device 3 are arranged. The intervening space 6 is accessible by virtue of the fact that the outer cover 16 and the inner cover 17 can be folded away from one another around the joint 7.

Figure 1:
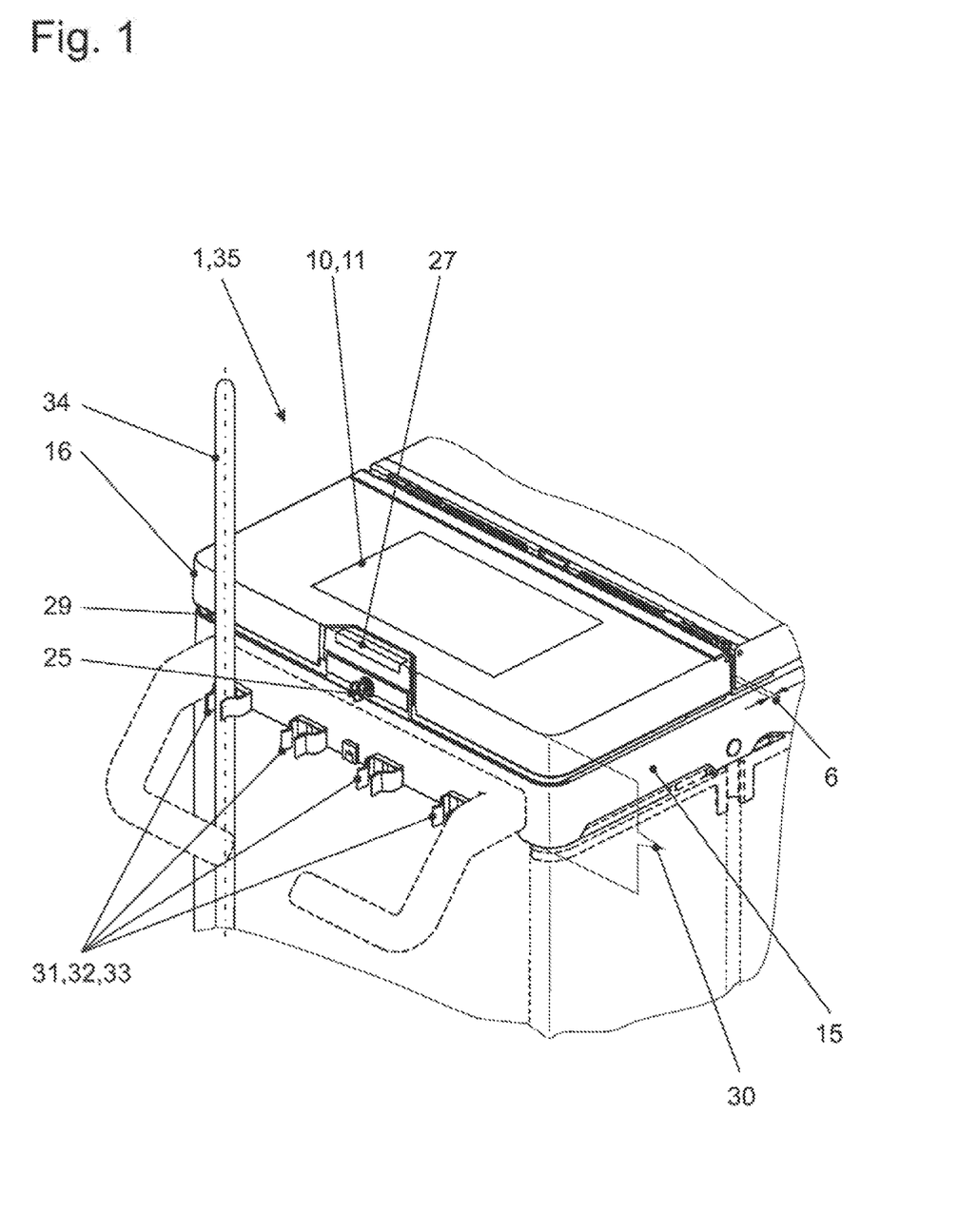
FIG. 1 shows an exemplary embodiment of a cleaning cart according to the invention in a perspective top view.

FIG. 1 shows a perspective top view of the cleaning cart. The cover 35, which comprises the outer cover 16 and the inner cover 17, is fastened to the frame 29, which is arranged and locked onto the container that opens upwards 15.

The outer cover 16 comprises a transparent field of view 10, which is designed as a touch-sensitive control panel 11 for operating the communication device 3, not visible here, which is arranged in the communication device holder 2. The transparent field of view 10 may, for example, be tinted such that a mobile communication device that is not being operated is essentially invisible under the transparent field of view 10. This better protects the communication device 3 against theft.

The touch-sensitive control panel 11 is in direct contact with the display of the mobile communication device. Even though the user does not directly access the display of the mobile communication device, it can easily be activated by means of the touch-sensitive control panel 11.

The outer cover 16 is provided with the first lock 25 for locking the cover 35 in the closed position shown here.

In addition, a second lock 26 is provided between the inner cover 17 and the outer cover 16.

Figure 2:
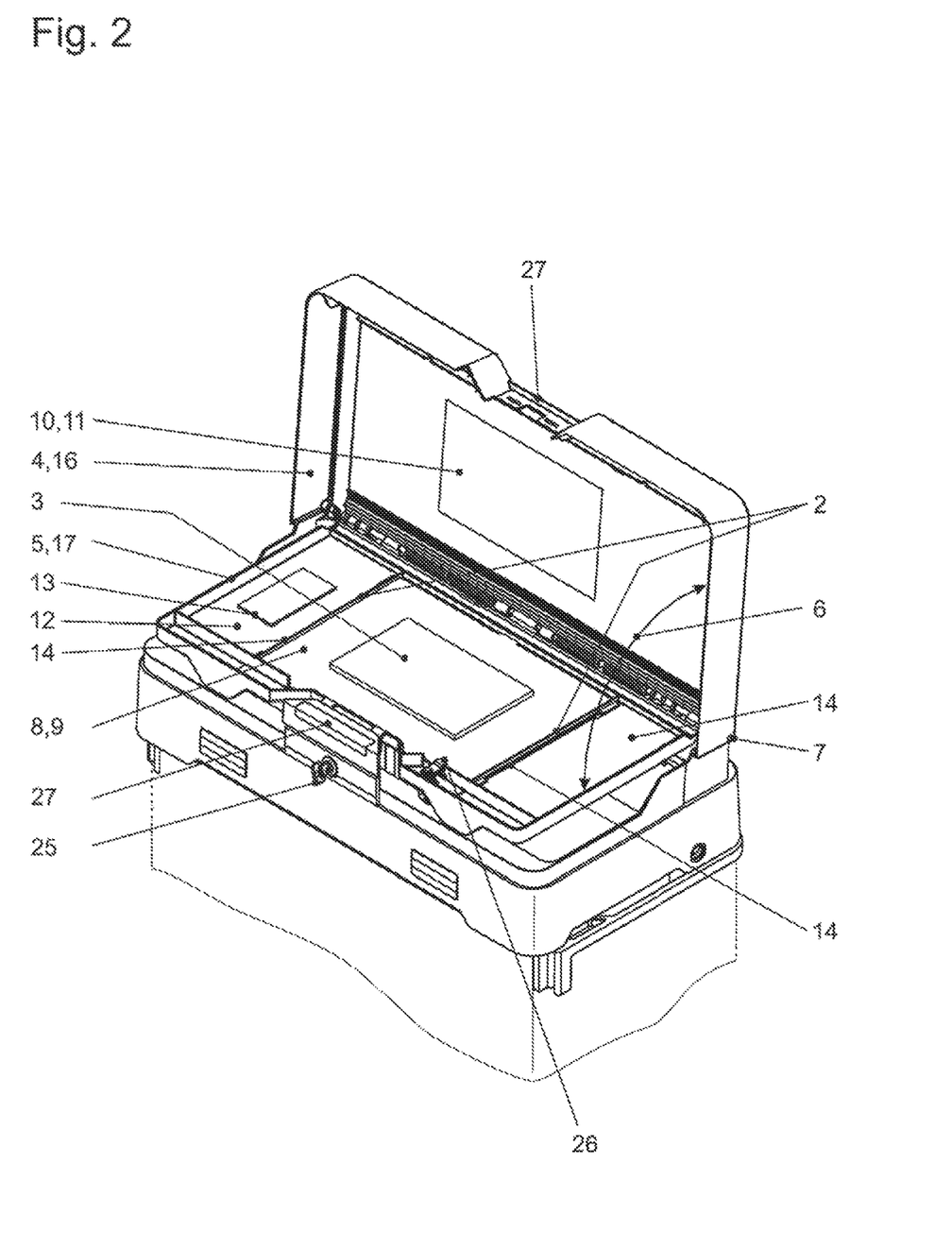
FIG. 2 shows the cleaning cart from FIG. 1 with an accessible intervening space in which a communication device holder with a mobile communication device is arranged.

In FIG. 2, the outer cover 16 and the inner cover 17 are swung away from each other around the joint 7 and the intervening space 6 is freely accessible. It can be seen in FIG. 2 that the communication device holder 2 is arranged flush with the surface in a recess 9 of the inner cover 17. To the left and right of the communication device holder 2, which is no longer covered by the field of view 10 when the intervening space is closed, further storage areas 12 are provided, for example, for storing peripheral devices 13 of the communication device 3. The peripheral devices 13 are also arranged in corresponding holders 14. Both the communication device 3 and the peripheral devices 13 are thereby arranged inside the intervening space 6 in a non-slip manner.

Figure 3:
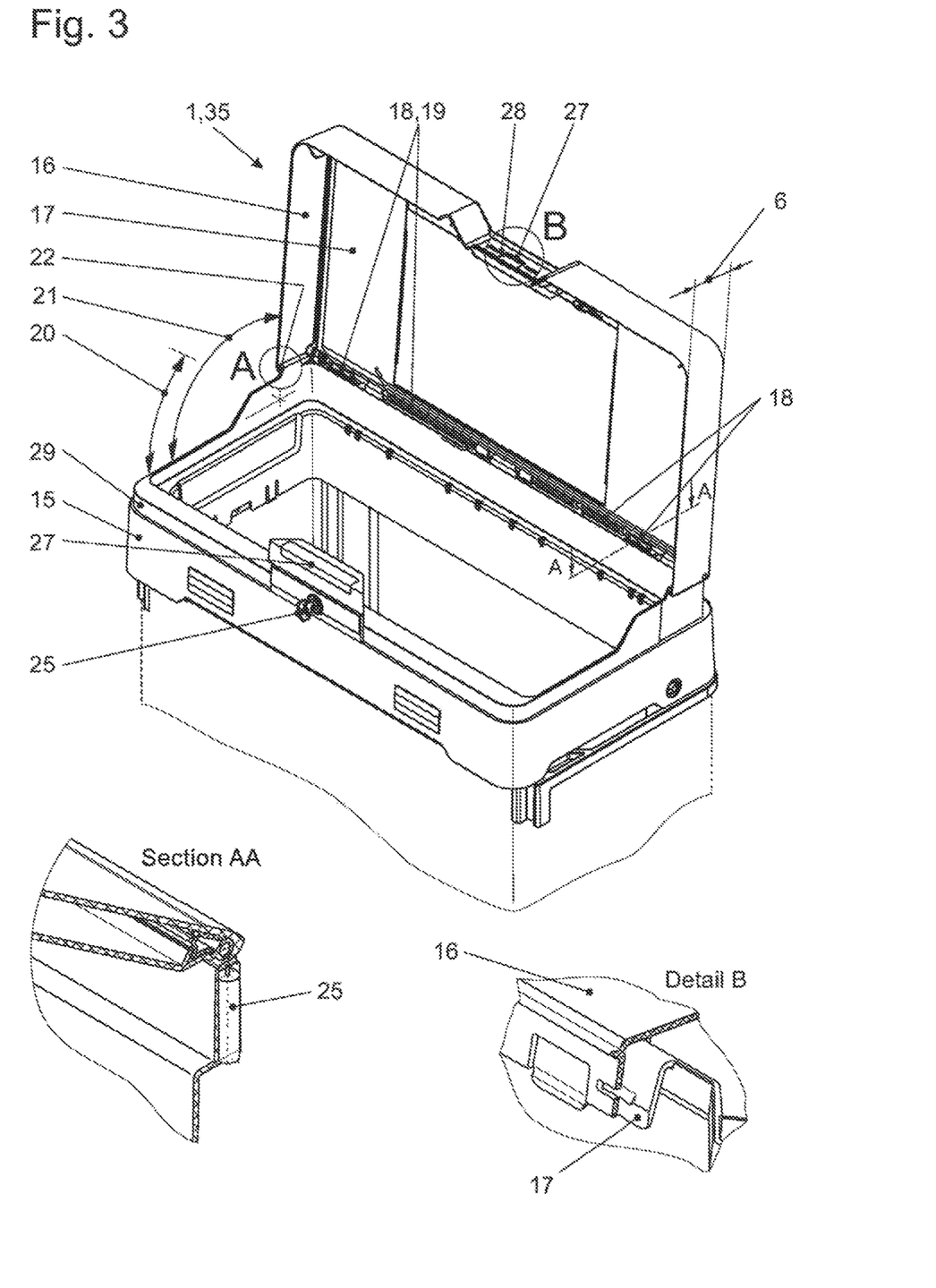
FIG. 3 shows the cleaning cart from FIG. 2 with a completely folded open cover and freely accessible container that opens upwards.

FIG. 3 shows the cleaning cart from FIG. 2, wherein, however, the outer cover 16 and the inner cover 17 are fixed to one another by the second lock 26, and the intervening space 6 is thereby closed.

In contrast, the first lock 25 is open, such that the cover 35 is in the open position as a whole. The container that opens upwards 15 is therefore freely accessible.

The cover 35 is held in its open position by the spring-damper system 18, which includes the end position damping 19. In the exemplary embodiment shown here, the end position damping 19 comes into operation starting from a first opening angle 20 of 45°, irrespective of whether or not the cover 35 is equipped with a mobile communication device 3.

Starting from the first opening angle 20, the cover 35 moves in a damped manner into its end position, wherein the end position is defined by an end stop 22. In the illustrated embodiment, the cover 35 in the end position forms a second opening angle 21 between the closed position shown in FIG. 1 and the open position shown in FIG. 3, which is slightly greater than 90°.

Figure 4:
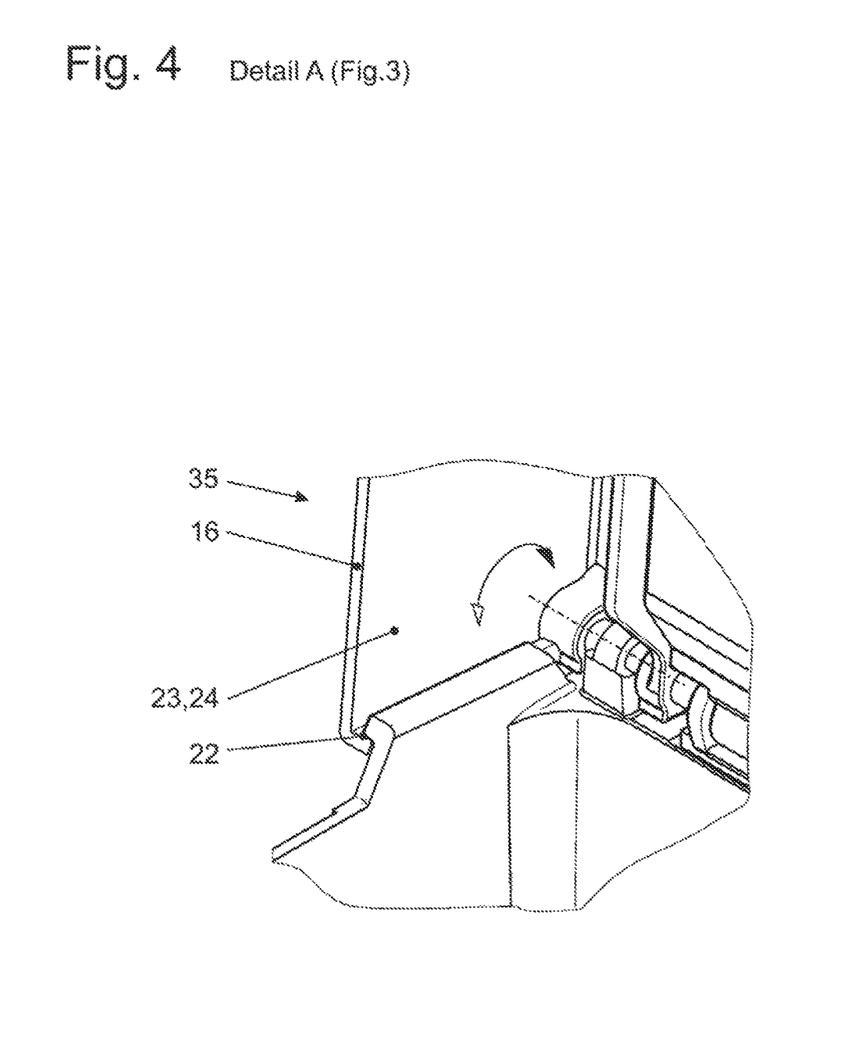
FIG. 4 is a detail of the cleaning cart from FIG. 1 showing the end stop of the cover.

FIG. 4 shows a detail of one of the lateral cover sides 23, 24 from FIG. 1. The end stop 22 shown in FIG. 4 is integrated into at least one lateral cover side 23, 24 of the outer cover 16. In the open position, as shown in FIG. 3, the open cover 35 is held against the end stop 22 in a positive-locking manner by the spring-damper system 18 with elastic pretensioning.

The outer cover 16 comprises the first unlocking device 27 which, after being activated, moves the cover 35 out of its closed position automatically through a spring force by means of the spring-damper system 18 until it reaches the end stop 22 in the open position. The intervening space 6, on the other hand, can be opened or closed by the second unlocking device 28, wherein the second unlocking device 28 forms part of the outer 16 or inner cover 17.

Both unlocking devices 27, 28 should be as simple as possible for the user to operate. This can be achieved, for example, in that at least one of the unlocking devices 27, 28 is designed as a spring-loaded latch, which is unlocked by simple pressing. Unlocking can be quickly and simply achieved, for example, by the user activating the latch with an elbow.

If, on the other hand, the cover is to be closed, the user presses it into the closed position. The spring-loaded latch then automatically locks the cover onto the container that opens upwards.

In the cleaning cart shown, the frame 29 and the cover 35 form the preassembled unit 30. This unit 30 can be placed and locked in its entirety onto the container that opens upwards 15.

By way of example, the container 35 may be provided with functional elements 31 on its outer circumference, which, in the exemplary embodiment shown here, are formed by holding clips 32 or hooks 33. In this way, cleaning devices 34, for example, can be accommodated on the cleaning cart.

The digitalized cleaning cart can be used to monitor cleaning quality, to electronically maintain a logbook or checklist, to fill in or generate forms and reports, to electronically create and/or manage cleaning schedules, to electronically report completion of cleaning, and/or to communicate the location where the cleaning cart is located to a cleaning center.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cleaning cart, comprising:
a support body;
a communication device holder configured to receive a mobile communication device; and
at least one cleaning device,
wherein the communication device holder is secured to the support body,
wherein the support body comprises a double-shell construction, comprising an outer first shell and an inner second shell,
wherein the first shell covers the second shell in a clam-shell manner, wherein the first shell and the second shell define an intervening space, wherein the communication device holder is arranged in the intervening space, wherein the first and the second shell are foldable away from each other by a joint to open the intervening space, and wherein the support body comprises a cover for a container that opens upwards, the first shell comprises an outer cover, and the second shell comprises an inner cover.

2. The cleaning cart according to claim 1, wherein the communication device holder is connected to the first shell or to the second shell in a force-fitting and/or positive-locking manner.

3. The cleaning cart according to claim 1, wherein the support body and the communication device holder or the second shell and the communication device holder are configured to merge integrally into one another and comprise a same material.

4. The cleaning cart according to claim 1, wherein the communication device holder is arranged on a side of the second shell that faces the first shell.

5. The cleaning cart according to claim 1, wherein the second shell has a hole or recess, in which the communication device holder is arranged.

6. The cleaning cart according to claim 5, wherein the communication device holder is arranged essentially flush with a surface inside the hole or recess.

7. The cleaning cart according to claim 1, wherein the first shell has a transparent field of view which is essentially superimposed on the communication device holder.

8. The cleaning cart according to claim 7, wherein the field of view is arranged in and is undetachable from the first shell.

9. The cleaning cart according to claim 7, wherein the field of view is arranged in the first shell in a force-fitting and/or positive-locking manner and is non-destructively detachable.

10. The cleaning cart according to claim 9, wherein the field of view is connected to the first shell by a snap-in device.

11. The cleaning cart according to claim 7, wherein the field of view comprises a touch-sensitive control panel configured to operate the communication device arranged in the communication device holder.

12. The cleaning cart according to claim 10, wherein the storage area has at least one peripheral device holder configured to receive the peripheral device.

13. The cleaning cart according to claim 1, wherein the second shell has at least one storage area adjacent to the communication device holder configured to store further objects.

14. The cleaning cart according to claim 1, wherein the cover is configured to be brought into an open or closed position by a spring-damper system.

15. The cleaning cart according to claim 14, wherein the spring-damper system comprises an end position damping.

16. The cleaning cart according to claim 15, wherein the end position damping starts from a first opening angle of the cover of ≥45°.

17. The cleaning cart according to claim 16 wherein the cover has a second opening angle of ≥90° which is limited by an end stop.

18. The cleaning cart according to claim 17, wherein the second opening angle is 90° to 95°.

19. The cleaning cart according to claim 17, wherein the end stop is arranged in at least one lateral cover side of the outer cover.

20. The cleaning cart according to claim 17, wherein the end stop is formed by a form fit.

21. The cleaning cart according to claim 1, wherein the outer cover comprises a first lock configured to lock the cover in a closed position and/or the inner cover comprises a second lock configured to lock the inner cover inside the outer cover.

22. The cleaning cart according to claim 21, wherein the second lock is connected downstream of the first lock in a functional series connection.

23. The cleaning cart according to claim 14, wherein the outer cover comprises a first unlocking device which, after being activated, moves the cover out of a closed position automatically through a spring force by the spring-damper system until it reaches the end stop in an open position.

24. The cleaning cart according to claim 23, wherein the outer or inner cover comprises a second unlocking device which, after being activated, brings the intervening space between the outer cover and the inner cover into an open position.

25. The cleaning cart according to claim 23, wherein the first unlocking device comprises a spring-loaded latch, which is unlockable by simple pressing and latches by itself when the cover is moved into the closed position.

26. A cleaning cart, comprising:
a frame;
a container that opens upwards, the container being disposed on the frame; and
a support body or a cover for the container that opens upwards, the cover comprising an outer first shell and an inner second shell, the outer first shell comprising an outer cover and the inner second shell comprising an inner cover,
wherein the support body or the cover is connectable to the container,
wherein the first shell covers the second shell in a clamshell manner,
wherein the first shell and the second shell define an intervening space,
wherein the communication device holder is arranged in the intervening space, and
wherein the first and the second shell are foldable away from each other by a joint to open the intervening space.

27. The cleaning cart according to claim 26, wherein the frame and the support body or the frame and the cover form a preassembled unit.

28. The cleaning cart according to claim 26, wherein the frame and the support body or the frame and the cover are connected to one another by a spring-damper system.

29. The cleaning cart according to claim 26, wherein the frame has functional elements on an outer circumference thereof.

30. The cleaning cart according to claim 29, wherein the functional elements comprise holding clips or hooks for cleaning devices.

31. A frame for a container that opens upwards of the cleaning cart according to claim 26.

32. A cleaning cart, comprising:
a support body;
a communication device holder configured to receive a mobile communication device; and
at least one cleaning device, wherein the communication device holder is secured to the support body,
wherein the support body comprises a double-shell construction, comprising an outer first shell and an inner second shell,
wherein the first shell covers the second shell in a clam-shell manner,
wherein the first shell and the second shell define an intervening space,
wherein the communication device holder is arranged in the intervening space,
wherein the first and the second shell are foldable away from each other by a joint to open the intervening space, and
wherein the first shell has a transparent field of view which is essentially superimposed on the communication device holder.

33. A device, comprising:
a support body; and
a communication device holder configured to receive a mobile communication device,
wherein the communication device holder is secured to the support body,
wherein the support body comprises a double-shell construction, comprising an outer first shell and an inner second shell,
wherein the first shell covers the second shell in a clam-shell manner,
wherein the first shell and the second shell define an intervening space,
wherein the communication device holder is arranged in the intervening space,
wherein the first and the second shell are foldable away from each other by a joint to open the intervening space,
wherein the support body comprises a cover for a container that opens upwards, the first shell comprises an outer cover, and the second shell comprises an inner cover, and
wherein the first shell has a transparent field of view which is essentially superimposed on the communication device holder.

* * * * *